(12) United States Patent
Nakayama et al.

(10) Patent No.: US 10,074,323 B2
(45) Date of Patent: Sep. 11, 2018

(54) LIQUID CRYSTAL DISPLAY DEVICE AND MANUFACTURING METHOD THEREOF

(71) Applicant: Panasonic Liquid Crystal Display Co., Ltd., Hyogo (JP)

(72) Inventors: Tomohiro Nakayama, Hyogo (JP); Hiroyuki Yabuki, Hyogo (JP); Ryutaro Oke, Hyogo (JP)

(73) Assignee: Panasonic Liquid Crystal Display Co., Ltd., Hyogo (JP)

( * ) Notice: Subject to any disclaimer, the term of this patent is extended or adjusted under 35 U.S.C. 154(b) by 136 days.

(21) Appl. No.: 14/743,543

(22) Filed: Jun. 18, 2015

(65) Prior Publication Data

US 2016/0372062 A1  Dec. 22, 2016

(51) Int. Cl.
*G09G 3/36* (2006.01)
*G02F 1/133* (2006.01)

(52) U.S. Cl.
CPC ........... *G09G 3/3611* (2013.01); *G02F 1/133* (2013.01); *G09G 2300/0426* (2013.01); *G09G 2330/00* (2013.01)

(58) Field of Classification Search
CPC ................. G09G 2330/04; G09G 2330/06
See application file for complete search history.

(56) References Cited

U.S. PATENT DOCUMENTS

| | | | | |
|---|---|---|---|---|
| 2001/0022565 A1* | 9/2001 | Kimura | ............. | G09G 3/3266 345/82 |
| 2003/0107127 A1* | 6/2003 | Murai | ............. | G02F 1/136204 257/724 |
| 2004/0004444 A1* | 1/2004 | Choi | ............. | G09G 3/3208 315/169.2 |
| 2004/0066358 A1* | 4/2004 | Numao | ............. | G09G 3/2011 345/76 |
| 2006/0017672 A1* | 1/2006 | Aoki | ............. | G09G 3/3233 345/77 |
| 2006/0145951 A1* | 7/2006 | Watanabe | ............. | G02F 1/136204 345/55 |
| 2007/0030434 A1* | 2/2007 | Hirabayashi | ............. | G02F 1/136204 349/149 |
| 2008/0094321 A1* | 4/2008 | Park | ............. | G09G 3/3225 345/76 |
| 2008/0284697 A1* | 11/2008 | Nam | ............. | G02F 1/1345 345/87 |
| 2008/0291379 A1 | 11/2008 | Takenaka et al. | | |
| 2009/0190648 A1* | 7/2009 | Sakano | ............. | G09G 5/003 375/232 |

(Continued)

*Primary Examiner* — William Lu
(74) *Attorney, Agent, or Firm* — McDermott Will & Emery LLP

(57) ABSTRACT

A liquid crystal display device includes an image display area including a plurality of pixels arranged in a matrix, and a peripheral area disposed outside the image display area and including circuitry. The peripheral area includes a first potential supply layer, a second potential supply layer and a third potential supply layer. The first potential supply layer is provided to supply a potential to a common electrode of the plurality of pixels in the image display area. The third potential supply layer is connected to power supply circuitry for receiving the potential. The second potential supply layer includes bridge patterns separated by spaces, and the bridge patterns connect the first potential supply layer and the second potential supply layer.

19 Claims, 7 Drawing Sheets

(56) References Cited

U.S. PATENT DOCUMENTS

| | | | |
|---|---|---|---|
| 2011/0075682 A1* | 3/2011 | Altmann | G09G 5/006 370/465 |
| 2011/0141550 A1* | 6/2011 | Ishida | G02F 1/136204 359/296 |
| 2014/0191930 A1 | 7/2014 | Okumoto | |
| 2015/0364396 A1* | 12/2015 | Asai | G02F 1/13336 257/43 |

* cited by examiner

LIQUID CRYSTAL DISPLAY DEVICE AND MANUFACTURING METHOD THEREOF

TECHNICAL FIELD

This application relates to a liquid crystal display (LCD) device and a manufacturing method thereof.

BACKGROUND

In manufacturing an LCD device, several test and/or inspection operations are performed. For example, at one stage of the manufacturing process of the LCD device, the disconnection of gate signal lines is inspected by means of lighting/non-lighting of pixels of a display area of the LCD device. During this inspection, switching elements (for example, transistors) are used to select gate signal lines to be tested. However, when the switching elements are disposed on the peripheral region of the LCD device, supplying power or potential for a common electrode may be disturbed because of limited areas for power supply portion.

SUMMARY

According to one aspect of the present disclosure, a liquid crystal display (LCD) device, includes an image display area including a plurality of pixels arranged in a matrix, and a peripheral area disposed outside the image display area and including circuitry. The peripheral area includes a first potential supply layer, a second potential supply layer and a third potential supply layer. The first potential supply layer is provided to supply a potential (i.e., voltage) to a common electrode of the plurality of pixels in the image display area. The third potential supply layer is connected to power supply circuitry for receiving the potential. The second potential supply layer includes bridge patterns separated by spaces. The bridge patterns connect the first potential supply layer and the second potential supply layer.

In the present disclosure, when inspection or test circuitry is disposed in the peripheral area of the LCD device, by providing spaces and bridge patterns in a conductive layer extending from a common electrode in the image display area over the inspection or test circuitry, it is possible to place the inspection or test circuitry in the peripheral area while maintaining sufficient potential supply to the common electrode. The forgoing configuration can also reduce the size of the LCD device.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only. In fact, the dimensions of the various features may be arbitrarily increased or reduced for clarity of discussion.

FIGS. 11A and 11B to FIGS. 18A and 18B show the corresponding cross sectional views of a TFT in the peripheral area corresponding to B-B' line of FIG. 7 and a TFT in the image display area at each step of FIG. 10.

DETAILED DESCRIPTION

It is to be understood that the following disclosure provides many different embodiments, or examples, for implementing different features of the present subject matter. Specific embodiments or examples of components and arrangements are described below to simplify the present disclosure. These are, of course, merely examples and are not intended to be limiting. For example, dimensions of elements are not limited to the disclosed range or values, but may depend upon process conditions and/or desired properties of the device. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Various features may be arbitrarily drawn in different scales for simplicity and clarity.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. In addition, the term "made of" may mean either "comprising" or "consisting of."

Figure 1:
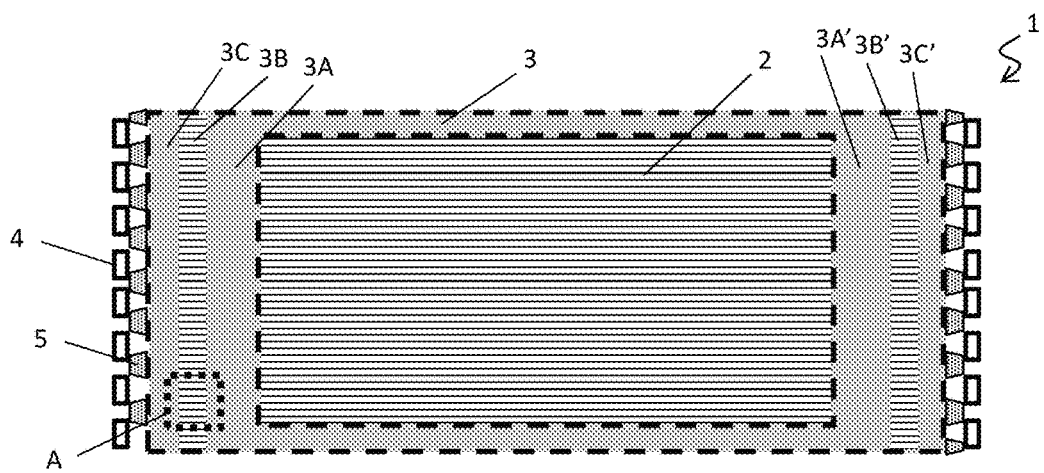
FIG. 1 is an exemplary planar view of an LCD device according to one embodiment of the present disclosure.

FIG. 1 shows an exemplary planar view of an LCD device 1 according to one embodiment of the present disclosure. The LCD device 1 generally includes an image display area 2 and a peripheral area 3.

The LCD device 1 generally includes a lower transparent insulating substrate 6 (see, FIG. 8) and an upper transparent insulating substrate (not shown) arranged opposite to the lower substrate at a predetermined distance. In the present embodiment, the LCD device 1 has a rectangular shape having a longer side extending in a first direction and a shorter side extending in a second direction substantially perpendicular to the first direction. A liquid crystal layer (not shown) including liquid crystal molecules is interposed between the lower and upper substrates. On the lower substrate 6, a plurality of gate bus lines 20 (see, FIGS. 2 and 3) and a plurality of data bus lines (not shown) are formed. An area formed by two adjacent gate bus lines intersecting two adjacent data bus lines defines a unit pixel. Accordingly, a plurality of unit pixels are arranged in a matrix in the image display area 2. A thin film transistor (TFT) is formed at a selected intersection of the gate bus line and the data bus line for each unit pixel. A common electrode made of a transparent conductor material is disposed in each unit pixel. A pixel electrode also made of a transparent conductor material is arranged in each unit pixel and insulated from the common electrode of the same unit pixel to generate a fringe field in the liquid crystal layer in cooperation with the common electrode.

The peripheral area 3 is disposed in a peripheral region of the LCD device 1 and includes a variety of circuits to control or to test elements in the image display area 2.

In at least one of the peripheral regions along the shorter side (e.g., left and right peripheral regions as shown in FIG. 1), the peripheral area 3 includes a first area 3A, a second area 3B and a third area 3C, as shown in FIG. 1. The first area 3A is disposed closer to the image display area 2 than the third area 3C, and the second area 3B is disposed between the first area 3A and the third area 3C along the first direction.

Figure 2:
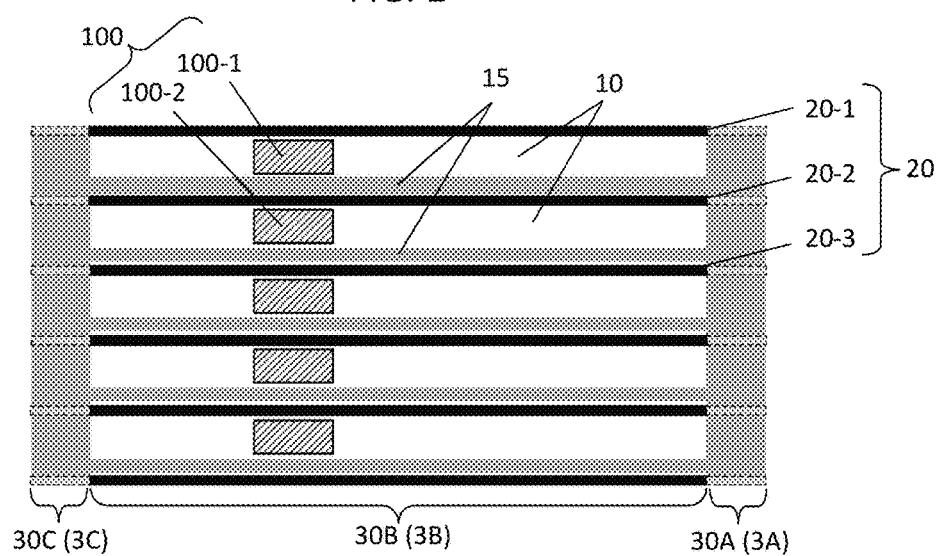
FIGS. 2 and 3 are exemplary enlarged planar views of the LCD device corresponding to area A of FIG. 1.
Figure 3:
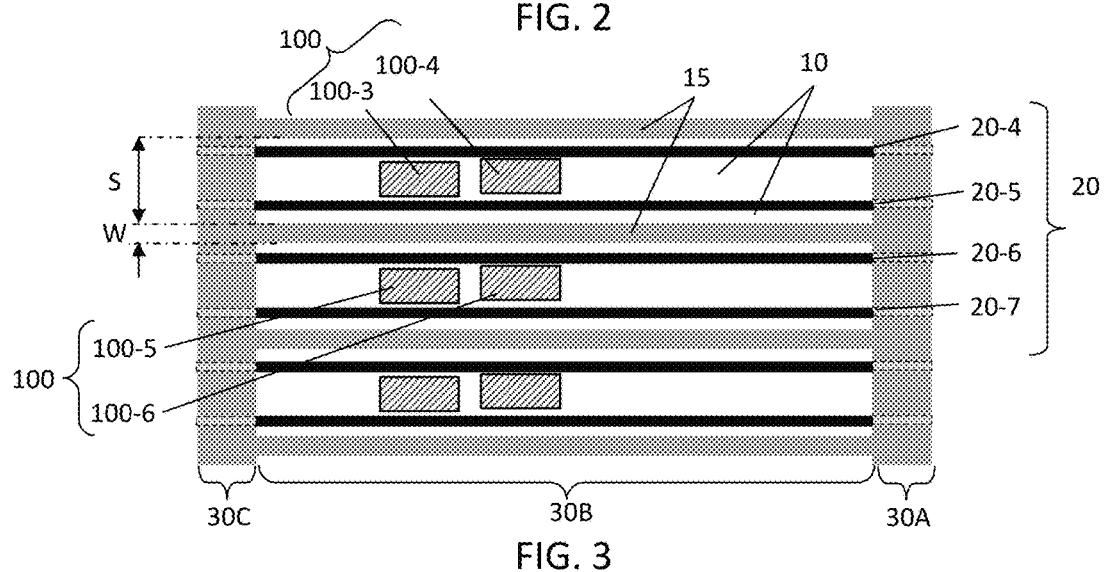
Figure 4:
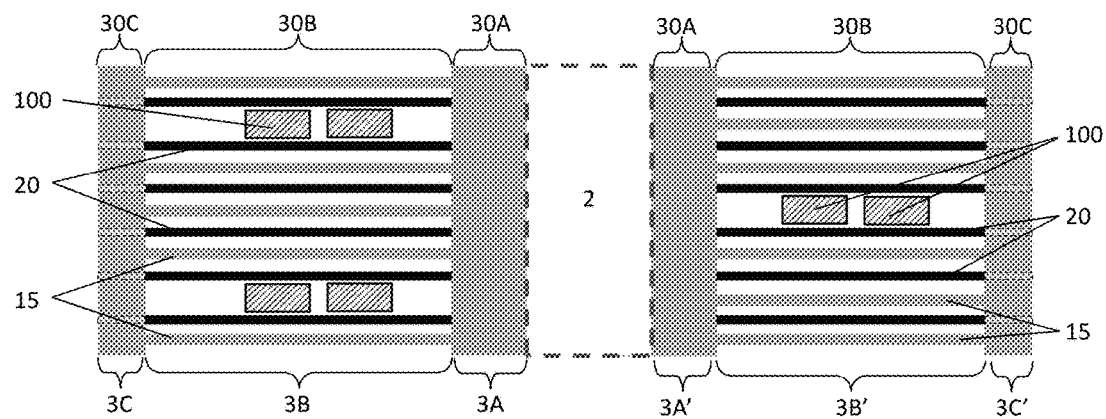
FIG. 4 is another exemplary planar view of the LCD device according to one embodiment of the present disclosure.

In the first area 3A, a first potential supply layer 30A made in the same layer and by the same material as the common electrodes in the image display area is disposed. The first potential supply layer 30A is electrically connected to the common electrodes of the image display area 2 to provide a predetermined potential (e.g., a common voltage) to the common electrodes. As shown in FIGS. 2-4, the first potential supply layer 30A has a rectangular shape, of which the longer side extends in the second direction substantially from one end to another end of the LCD device 1.

In the third area 3C, similar to the first area 3A, a third potential supply layer 30C made in the same layer and by the same material as the first potential supply layer 30A and the common electrodes in the image display area is disposed. Similar to the first potential supply layer 30A, the third potential supply layer 30C has a rectangular shape, of which the longer side extends in the second direction substantially from end to end of the LCD device 1. The third potential supply layer 30C is configured to receive a predetermined potential from outside the LCD device 1. The distance between the first potential supply layer 30A and the third potential supply layer 30C may be, for example, in a range of about 1000 μm to about 2000 μm.

In the second area 3B, a second potential supply layer 30B made in the same layer and by the same material as the first and third potential supply layers and the common electrodes in the image display area is disposed. The second potential supply layer 30B includes a plurality of spaces 10 and a plurality of bridge patterns 15 disposed between the spaces 10. The plurality of bridge patterns 15 are connected to the first potential supply layer 30A and the third potential supply layer 30C, thereby the potential applied to the third potential supply layer 30C is supplied to the common electrode through the bridge patterns 15 and the first potential supply layer 30A.

At the lateral end of the third potential supply layer 30C, a plurality of flexible printed circuit boards (FPCs) 4 and a plurality of gate driver circuits 5 are provided. At least one of the FPC 4 and the gate driver circuits 5 supply the potential to the third potential supply layer 30C.

FIG. 2 is an exemplary enlarged planar view of the LCD device 1 corresponding to area A of FIG. 1 according to one embodiment of the present disclosure. Although other layers are disposed in this area A, FIG. 2 illustrates only the first to third potential supply layers 30A-30C, gate bus lines 20 and circuit elements 100.

As shown FIG. 2, a plurality of gate bus lines 20 (e.g., 20-1 to 20-6) and a plurality of circuit elements 100 are disposed in the spaces 10 in the second potential supply layer 30B. In FIG. 2, one gate bus line and one circuit element 100 are disposed in one space 10. The plurality of gate bus lines 20 extend from the image display area 2 in the first direction. The plurality of circuit elements 100 are disposed between the adjacent gate bus lines in the second area 3B in a planar view. For example, a circuit element 100-1 is disposed between the gate bus line 20-1 and 20-2. As shown in FIG. 2, the bridge patterns 15 are disposed so as not to overlap the gate bus lines 20 and the circuit elements 100. In some embodiments, the bridge patterns 15 may partially overlap the gate bus lines 20 and/or the circuit elements 100. The width of the gate bus lines 20 may be in a range of 10 μm to 50 μm in some embodiments, and may be in a range of 10 μm to 30 μm in other embodiments.

As shown in FIG. 2, since the spaces 10 are provided in the second potential supply layer 30B, the gate bus lines 20 and the circuit elements 100 are disposed in the spaces 10, and further the bridge patterns 15 connect the first potential supply layer 30A and the third potential supply layer 30C, the potential supplied at the third potential supply layer 30C can be supplied from at least one of the FPC 4 and the gate driver circuit boards 5 to the common electrode in the image display area 2.

FIG. 3 is another exemplary enlarged planar view of the LCD device 1 corresponding to area A of FIG. 1. Similar to FIG. 2, FIG. 3 illustrates only the first to third potential supply layers 30A-30C, gate bus lines 20 and circuit elements 100.

In FIG. 3, two circuit elements 100 and two gate bus lines 20 are disposed in one space 10. For example, circuit elements 100-3 and 100-4 and gate bus lines 20-4 and 20-5 are disposed in one space 10, and circuit elements 100-5 and 100-6 and gate bus lines 20-6 and 20-7 are disposed in the adjacent space 10. The circuit elements 100-3 and 100-4 are disposed between the gate bus lines 20-4 and 20-5, while no circuit elements are disposed between the gate bus lines 20-5 and 20-6. The bridge patterns 15 are disposed so as not to overlap the gate bus lines 20 and the circuit elements 100. In some embodiments, the bridge patterns 15 may partially overlap the gate bus lines 20 and/or the circuit elements 100.

As shown in FIG. 3, since two circuit elements are disposed along the first direction within one space 10, it is possible to reduce the width S of the space 10 (or a pitch of the spaces 10), thereby reducing the size of the LCD device 1. In other words, when the dimension of the side along the second direction (shorter side) is small, the arrangement of FIG. 3 is more suitably used. Further, since it is also possible to increase the width W of the bridge pattern 15, the entire resistance of the second potential supply layer 30B can be reduced. In FIG. 3, the pitch of the bridge patterns 15 is twice the pitch of the gate bus lines 20. The width W of the bridge pattern 15 may be in a range of 20 μm to 100 μm in some embodiments, and may be in a range of 30 μm to 60 μm in other embodiments. The width S of the space 10 in FIG. 3 may be in a range of 100 μm to 400 μm in some embodiments, and may be in a range of 200 μm to 300 μm in other embodiments.

In one embodiment of the present disclosure, each of the circuit elements 100 includes a switching circuit, which is used to inspect a defect(s) in the gate bus lines (e.g., an open circuit/disconnection of the gate bus lines). The switching circuit may include a TFT, of which a source or a drain is connected to a corresponding one of the gate bus lines 20.

Figure 5:
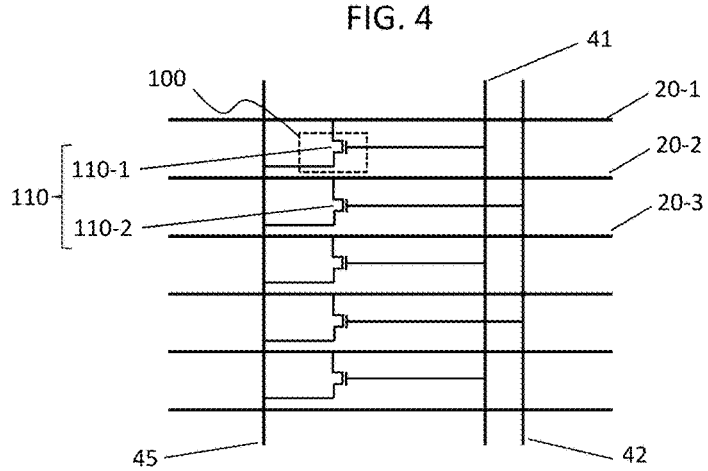
FIGS. 5 and 6 show exemplary circuit diagrams corresponding to FIGS. 2 and 3, respectively.
Figure 6:
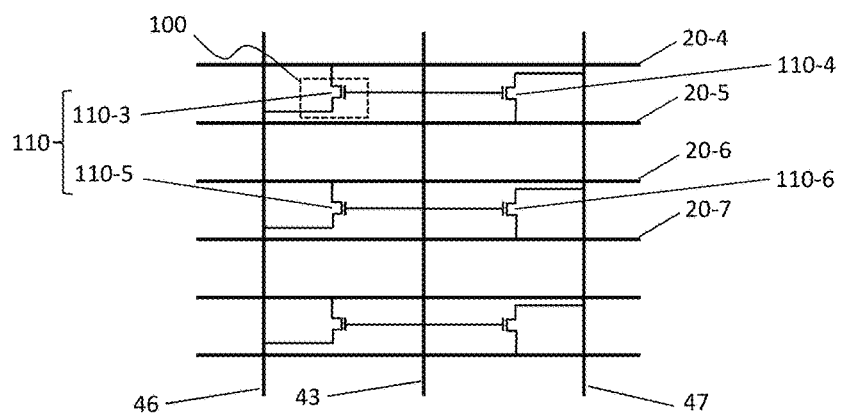

FIGS. 5 and 6 are exemplary circuit diagrams corresponding to FIGS. 2 and 3, respectively, when the circuit elements 100 are TFTs.

During a manufacturing process of the LCD device 1, one or more inspections and/or tests are performed at specific steps to inspect if the LCD device has been properly manufactured without defects. In one of such inspection techniques, an inspection terminal of an inspection apparatus is brought into contact with an inspection terminal of the LCD device, and then inspection signals are input to the plurality of gate bus lines by means of a plurality of switching elements (e.g., TFTs) connected with the gate bus lines, to inspect the plurality of gate bus lines in a batch.

As shown in FIG. 5, in one embodiment of the present disclosure, a first inspection signal line 41, a second inspection signal line 42 and a third inspection signal line 45 are provided in the second area 3B. The gate (a control terminal) of the first TFT 110-1 is connected to the first inspection signal line 41, one of the source and the drain of the first TFT 110-1 is connected to the gate bus line 20-1, and the other of the source and the drain of the first TFT 110-1 is connected to the third inspection signal line 45. The gate of the second TFT 110-2 is connected to the second inspection signal line 42, one of the source and the drain of the second TFT 110-2 is connected to the gate bus line 20-2, and the other of the source and the drain of the second TFT 110-2 is connected to the third inspection signal line 45. Similarly, odd numbered TFTs are connected between odd numbered gate signal lines and the third inspection signal line 45 and are controlled by a signal on the first inspection signal line 41, while even numbered TFTs are connected between even numbered gate signal lines and the third inspection signal line 45 and are controlled by a signal on the second inspection signal line 42. By applying gate ON signals to the first inspection signal line 41 while power is supplied through the third inspection signal line 45, it is possible to inspect disconnection/open defects in the odd numbered gate bus lines by detecting a conducting or non-conducting state. Similarly, by applying gate ON signals to the second inspection signal line 41 while power is supplied through the third inspection signal line 45, it is possible to inspect disconnection/open defects in the even numbered gate bus lines.

In the embodiment of FIG. 5, two inspection signal lines to supply the gate ON signals are provided to inspect even numbered gate bus lines and odd numbered gate bus lines, separately. In another embodiment, one inspection signal line to supply the gate ON signal may be provided to inspect both even numbered gate bus lines and odd numbered gate bus lines together.

Further, as shown in FIG. 1, additional first to third areas 3A', 3B' and 3C' may be provided on the other side of the LCD device 1, in some embodiments. In such a case, the odd numbered gate bus lines may be inspected through the TFTs disposed in second area 3B and the even numbered gate bus lines may be inspected through the TFTs disposed in the additional second area 3B'. Further, in certain embodiments, the n-th and (n+2)-th numbered gate bus lines (n=1, 2, 3, . . . ) may be inspected through the TFTs disposed in second area 3B and the (n+1)-th and (n+3)-th numbered gate bus lines may be inspected through the TFTs disposed in the additional second area 3B'. The n-th and (n+1)-th numbered gate bus lines (n=1, 2, 3, . . . ) may be inspected through the TFTs disposed in second area 3B and the (n+2)-th and (n+3)-th numbered gate bus lines may be inspected through the TFTs disposed in the additional second area 3B' in another embodiment.

As shown in FIG. 6, in another embodiment of the present disclosure, a first inspection signal line 43, a second inspection signal line 46 and a third inspection signal line 47 are provided in the second area 3B.

The gate of the first TFT 110-3 is connected to the first inspection signal line 43, one of the source and the drain of the first TFT 110-3 is connected to the gate bus line 20-4, and the other of the source and the drain of the first TFT 110-3 is connected to the second inspection signal line 46. The gate of the second TFT 110-4 is connected to the first inspection signal line 43, one of the source and the drain of the second TFT 110-4 is connected to the gate bus line 20-5, and the other of the source and the drain of the second TFT 110-4 is connected to the third inspection signal line 47.

Similarly, the gate of the first TFT 110-5 is connected to the first inspection signal line 43, one of the source and the drain of the first TFT 110-5 is connected to the gate bus line 20-6, and the other of the source and the drain of the first TFT 110-5 is connected to the second inspection signal line 46, while the gate of the second TFT 110-6 is connected to the first inspection signal line 43, one of the source and the drain of the second TFT 110-6 is connected to the gate bus line 20-7, and the other of the source and the drain of the second TFT 100-6 is connected to the third inspection signal line 47.

By applying ON signals to the first inspection signal line 43 while power is supplied through the second inspection signal line 46, it is possible to inspect disconnection/open defects in the gate bus lines 20-4, 20-6, . . . etc. by detecting a conducting or non-conducting state. Similarly, by applying ON signals to the first inspection signal line 43 while power is supplied through the third inspection signal line 47, it is possible to inspect disconnection/open defects in the gate bus lines 20-5, 20-7, . . . etc. by detecting a conducting or non-conducting state.

When the additional first to third areas 3A', 3B' and 3C' are provided on the other side of the LCD device 1, the n-th and (n+1)-th numbered gate bus lines (n=1, 2, 3, . . . ) may be inspected through the TFTs disposed in second area 3B and the (n+2)-th and (n+3)-th numbered gate bus lines may be inspected through the TFTs disposed in the additional second area 3B'.

In such a case, as shown in FIG. 4, more bridge patterns 15 can be provided between the first potential supply layer 30A and the third potential supply layer 30C in the second area 3B and between the first potential supply layer and the third potential supply layer in the additional second area 3B'.

In some embodiments, the circuit elements 100 may include electrostatic discharge protection (ESD) circuits. The ESD circuits may be used in addition to the TFTs.

Figure 7:
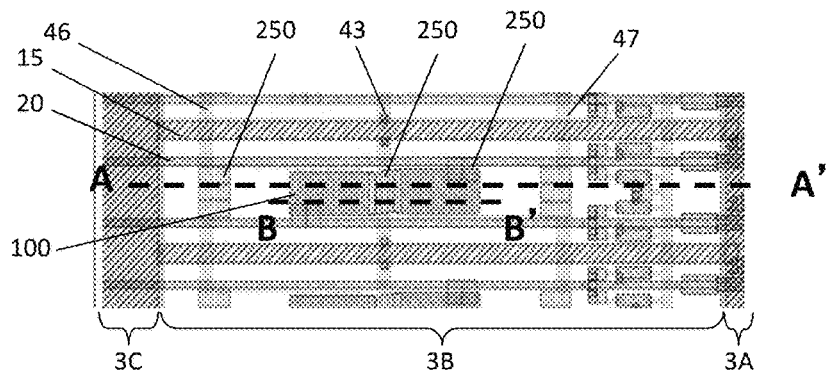
FIG. 7 is an exemplary enlarged planar view of the peripheral area of the LCD device according to one embodiment of the present disclosure.
Figure 8:
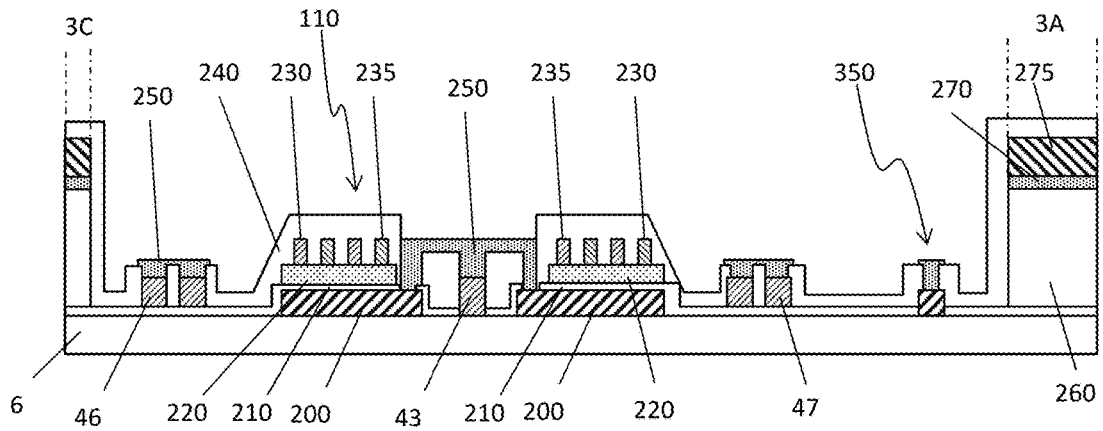
FIG. 8 is an exemplary cross sectional view along A-A' line of FIG. 7.
Figure 9:
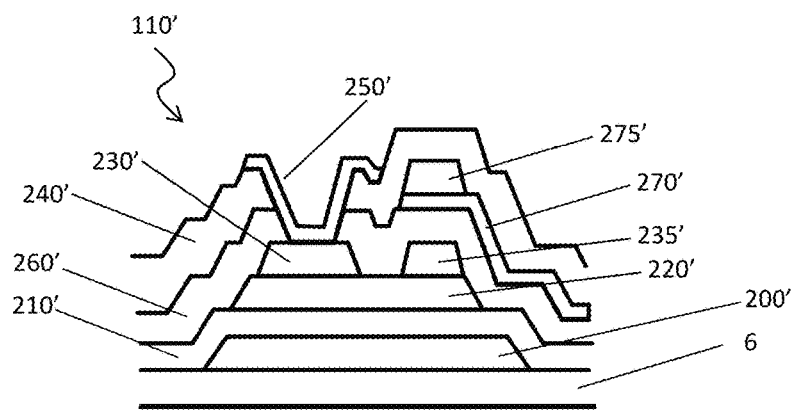
FIG. 9 is an exemplary cross sectional view of a TFT in the image display area according to one embodiment of the present disclosure.

The structures of the second area 3B are explained in more detail with reference to FIGS. 7 and 8. FIG. 7 shows an exemplary planar view of the second area 3B including two TFTs and an EDS circuit in one space 10. FIG. 8 shows an exemplary cross sectional view along the line A-A' of FIG. 7. FIG. 9 shows an exemplary cross sectional view of a TFT in the unit pixel of the image display region 2.

As shown in FIG. 8, a TFT 110 is formed on an insulating substrate 6 in the second area 3B. In FIG. 8, two TFTs 110 and one ESD circuit 350 are disposed. The insulating substrate 6 is a glass substrate in this embodiment. The TFT 110 includes a gate electrode 200, a gate insulating layer 210 formed over the gate electrode 200 and a semiconductor layer 220 formed on the gate insulating layer 210. In this embodiment, the gate electrode 200 is made of a metal material such as Al or Cu. In this embodiment, Cu is used. The gate insulating layer 210 is made of, for example, silicon oxide, silicon nitride or silicon oxynitride. The semiconductor layer 220 is made of, for example, amorphous or polycrystalline semiconductor. In this example, amorphous silicon (a-Si) is used. On the semiconductor layer 220, source 230 and drain 235 electrodes are formed. The source 230 and drain 235 electrodes are made of a metal material, such as Al, Cu, Ti or W. In this embodiment, Cu is used.

The unit pixel in the image display also includes a TFT 110' as shown in FIG. 9. The TFT 110' is formed on the insulating substrate 6. The TFT 100' includes a gate electrode 200', a gate insulating layer 210' formed over the gate electrode 200' and a semiconductor layer 220' formed on the gate insulating layer 210'. The materials for the gate electrode 200', the gate insulating layer 210' and the semiconductor layer 220' are the same as the materials for the TFT 100, and these layers are formed by the same manufacturing steps, respectively.

As shown in FIG. 8, the first inspection signal line 43, the second inspection signal line 46 and the third inspection signal line 47 are formed over the substrate 6 by the same material as the source and drain electrodes. The TFT 110 is covered by an upper insulating layer 240. Contact holes are provided over the gate electrode 200, the source 230 and drain 235 electrodes, and the first to third inspection signal lines 43, 46, 47, respectively, to electrically connect terminals of the TFT 110 to the gate bus line and the first and second (or third) inspection signal lines 43, 46 (or 47), respectively, by wiring layers 250 made of a conductive material. The conductive materials may include a transparent conductive material such as an ITO and/or a metal material.

In the first and third areas 3A, 3C, interlayer insulating layers 260 are provided. The interlayer insulating layers 260 includes an organic material such as acrylic resin, silicone resin, epoxy resin and polyimide resin. Inorganic insulating materials such as silicon oxide, silicon nitride or silicon oxynitride may be used as the interlayer insulating layer 260.

In the unit pixel, as shown in FIG. 9, the TFT 110' is covered by an interlayer insulating layer 260' and an upper insulating layer 240'. The materials for the interlayer insulating layer 260' and the upper insulating layer 240' are the same as the materials for the interlayer insulating layer 260' and the upper insulating layer 240', and these layers are formed by the same manufacturing steps, respectively. In FIG. 9, a contact hole for the source electrode 240' is shown. A pixel electrode 250' made of the conductive material is provided in the contact holes to connect source electrode 230' of the TFT 110'.

Further, in the unit pixel, a common electrode 270' and a common line 275' are provided between the interlayer insulating layer 260' and the upper insulating layer 240', as shown in FIG. 9. The common electrode 270' is made of a transparent conductive material layer such as an ITO. The common line 275' may be made of, for example, Cu to reduce a resistance of the common electrode 270'.

Similarly, in the peripheral area 3 (3A, 3B, 3C), the first, second and third potential supply layers 30A, 30B and 30C are made of the same materials as those for the common electrode 270' and the common line 275'. In the peripheral area 3, the metal layers 275' substantially fully cover the transparent conductive material layer 270' to reduce a resistance of the first, second and third potential supply layers 30A, 30B and 30C.

Figure 10:
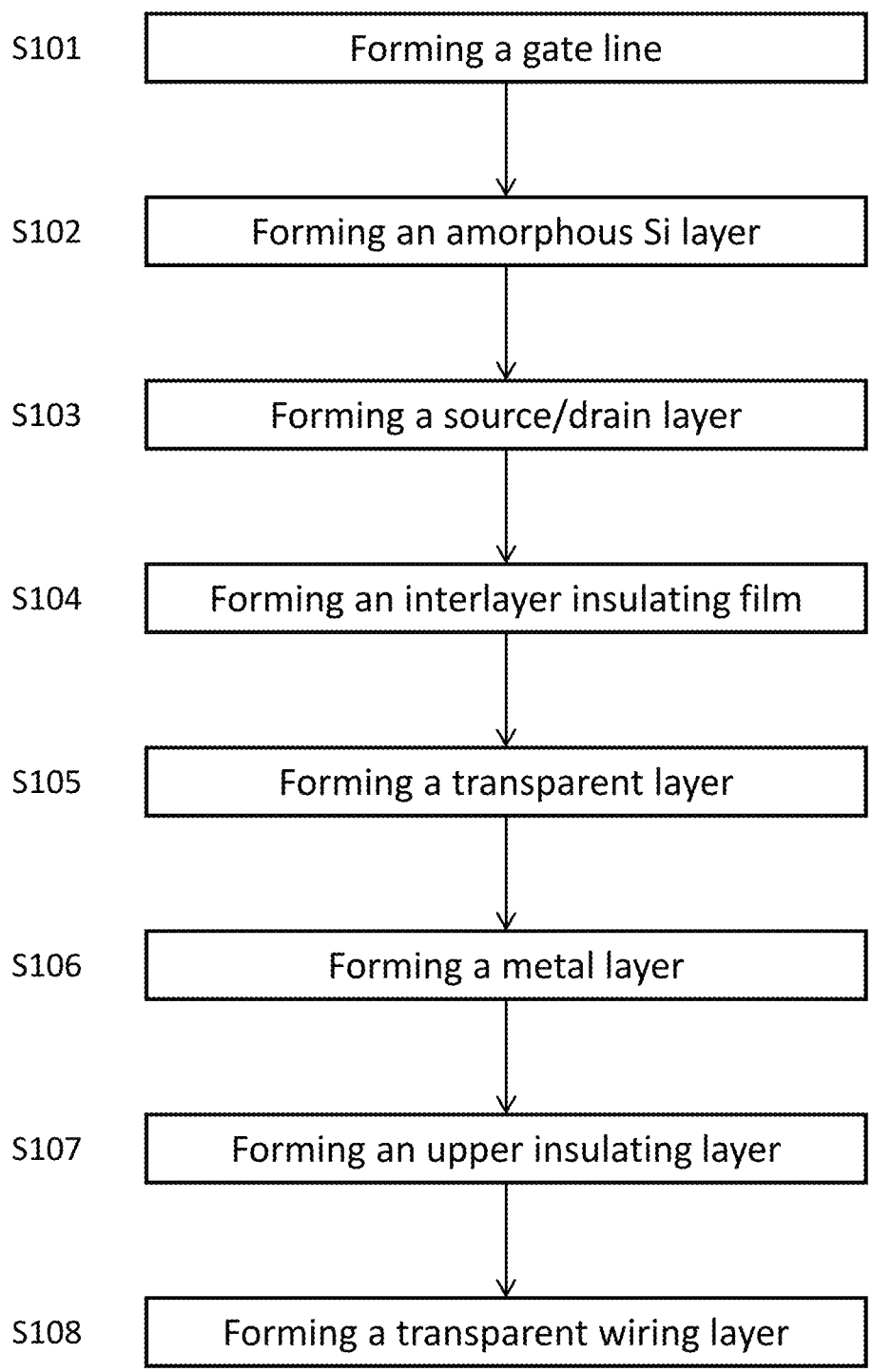
FIG. 10 shows an exemplary process flow for manufacturing a TFT according to one embodiment of the present disclosure.

With reference to FIG. 10, manufacturing processes of the LCD device 1 according to one embodiment of the present disclosure are explained. The general manufacturing process of a TFT in the unit pixel is described in U.S. Patent Publication No. 2014/0017833, the entire contents of which are incorporated herein by reference.

FIG. 10 shows an exemplary process flow for manufacturing a TFT 110 in the peripheral area and a TFT 110' in the image display area. FIGS. 11A and 11B to FIGS. 18A and 18B show the corresponding cross sectional view of the TFT 110 and TFT 110' in each step of FIG. 10.

Figure 11A:
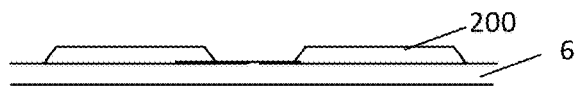
Figure 11B:
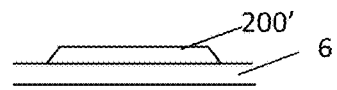

In S101, as shown in FIGS. 11A and 11B, gate electrodes 200, 200' are formed on the substrate 6. In this embodiment, a Cu layer is formed by a physical vapor deposition (PVD) such as a sputtering method on the glass substrate 6 and patterning processes are performed to form the gate electrodes 200, 200'. The gate bus lines are also formed in this step.

Figure 12A:
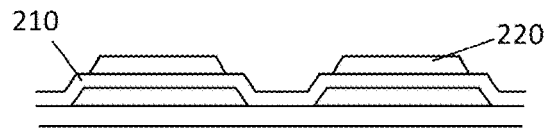
Figure 12B:
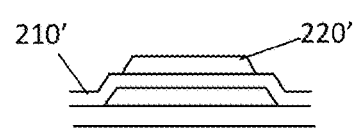

In S102, as shown in FIGS. 12A and 12B, after gate insulating layers 210, 210' are formed over the gate electrodes 200, 200', semiconductor layers 220, 220' are formed over the gate insulating layers 210, 210'. The gate insulating layer 210, 210' is formed by, for example, a chemical vapor deposition (CVD) method. Semiconductor layers 220, 220', for example, a-Si layer is also formed by a CVD method and patterning processes are performed to form the semiconductor layers 220, 220'.

Figure 13A:
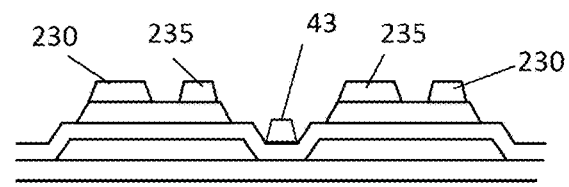
Figure 13B:
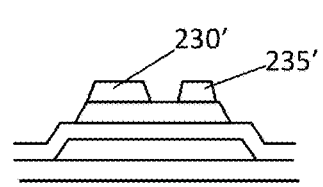

In S103, as shown in FIGS. 13A and 13B, source and drain electrodes 230, 230', 235, 235' are formed over the semiconductor layers. In this embodiment, a Cu layer is formed by a sputtering method over the semiconductor layers and patterning processes are performed to form the source and drain electrodes. The data bus lines (not shown), first to third inspection signal lines 41-43, 45-47 are also formed in this step.

Figure 19:
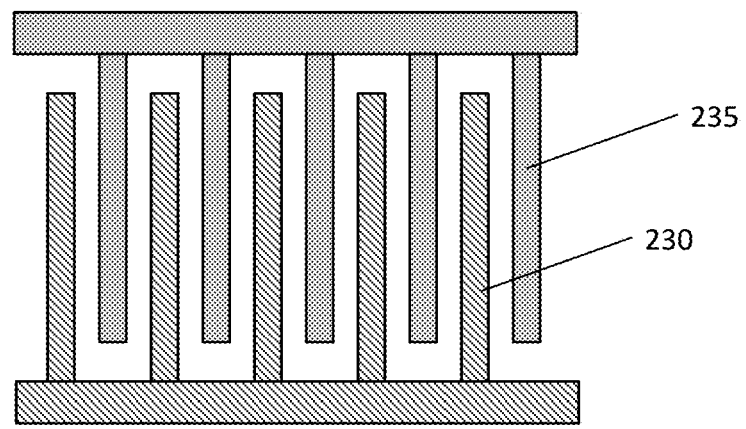
FIG. 19 is an exemplary enlarged planar view of a source and a drain of a TFT according to one embodiment of the present disclosure.

In FIG. 13A, the source and drain electrodes 230 and 235 are formed in an island shape in a planar view. However, the shape of the source and drain electrode of the TFT 110 is not limited to an island shape. In some embodiments, the source and drain electrode have a comb shape, and form a nesting structure as shown in FIG. 19.

Figure 14A:
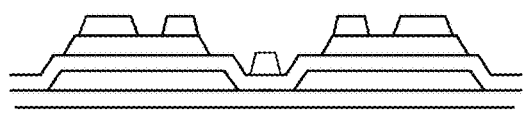
Figure 14B:
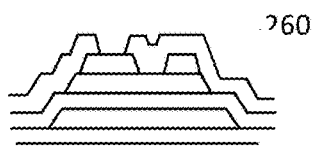

In S104, as shown in FIG. 14B, an interlayer insulating layer 260' is formed over the structure with the source and drain electrodes for the TFT 110' in the image display area. In the peripheral area, the interlayer insulating layer 260 is formed in the first and third areas 3A, 3C but is not formed in the second area 3B. Accordingly, no interlayer insulating layer 260 is formed over the TFT 110, as shown in FIG. 14A. After forming the interlayer insulating layer 260', a contact hole for a source electrode (or a drain electrode) is formed in the interlayer insulating layer 260'.

Figure 15A:
Figure 15B:
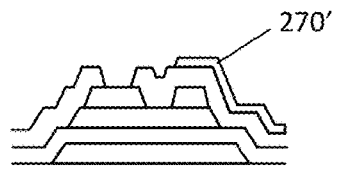

In S105, as shown in FIG. 15B, a common electrode 270' made of such as an ITO is formed over the interlayer insulating layer 260'. In the peripheral area, the transparent conductive layer 270 is formed in the first to third areas 3A, 3B, 3C but is not formed above the TFT 110 in the second area 3B, as shown in FIG. 15A.

Figure 16A:
Figure 16B:
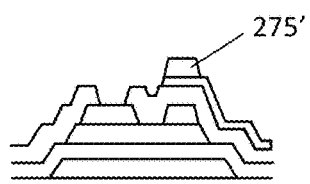

In S106, as shown in FIG. 16B, a metal layer such as a Cu layer for the common line 275' is formed over the common electrode 270'. In the peripheral area, the metal layer 275 is formed in the first to third areas 3A, 3B, 3C but is not formed above the TFT 110 in the second area 3B, as shown in FIG. 16A.

Figure 17A:
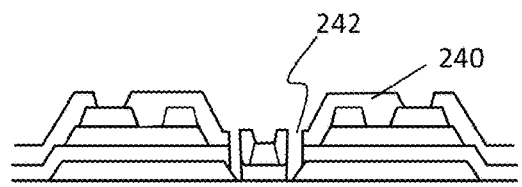
Figure 17B:
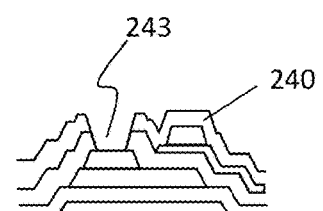

In S107, as shown in FIGS. 17A and 17B, an upper insulating layer 240 is formed in both the peripheral area and the image display area. After forming the upper insulating layer 240, contact holes for source electrodes (or drain electrodes) and for the first to third inspection signal lines are formed in the upper insulating layer 240.

Figure 18A:
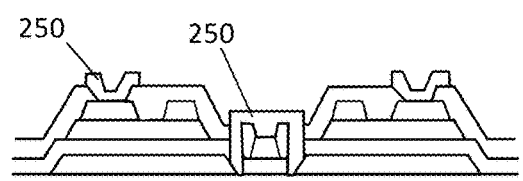
Figure 18B:
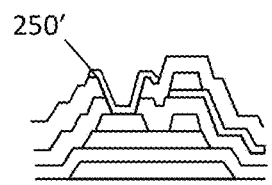

In S108, as shown in FIG. 18A, wiring layers 250 are formed in the peripheral area to electrically connect terminals of the TFTs 110, to the gate bus lines and the first to third inspection signal lines. As shown in FIGS. 18B, a pixel electrode 250' are formed in the display area.

In the above embodiment, the bridge patterns 15 and the spaces 10 are alternately and periodically formed in a line-and-space arrangement as the second potential supply layer 30B. However, the pattern of the second potential supply layer 30B it not limited to the line-and-space arrangement.

Figure 20:
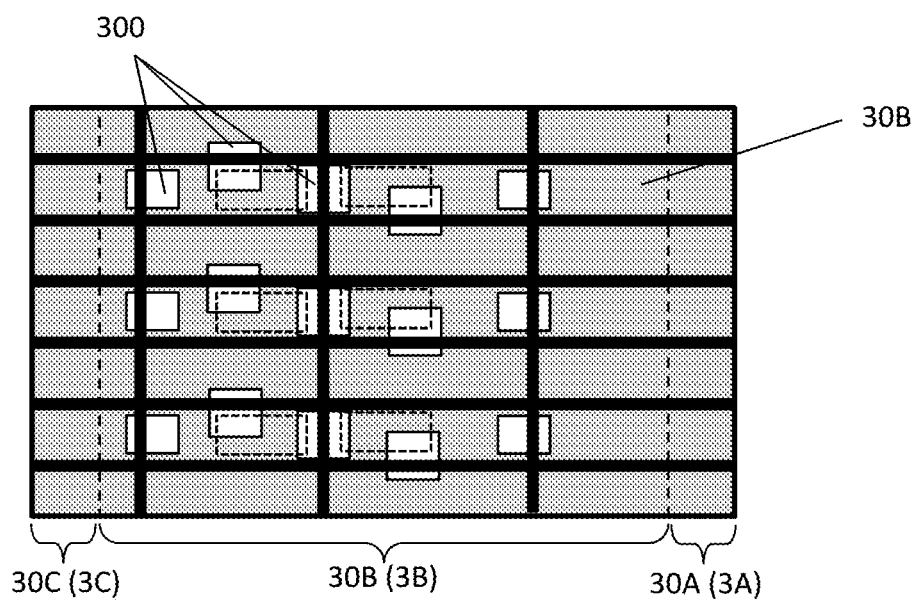
FIG. 20 is another exemplary enlarged planar view of the LCD device corresponding to area A of FIG. 1.

FIG. 20 shows another exemplary planar view of the second potential supply layer 30B. As explained in the manufacturing processes, contact holes are formed in S107 over the gate, source and drain electrodes of the TFT 100 to connect them to first to third inspection signal lines (or other circuitry), respectively (see, FIG. 6). Accordingly, the second potential supply layer 30B can simply have openings 300 around areas where the contact holes are later formed.

In the present disclosure, inspection or test circuitry is disposed in the peripheral area of the LCD device. By providing spaces and bridge patterns in the conductive layer extending from a common electrode in the image display area over the inspection or test circuitry, it is possible to place the inspection or test circuitry in the peripheral area while maintaining sufficient potential supply to the common electrode. The forgoing configuration can also reduce the size of the LCD device.

The foregoing outlines features of several embodiments or examples so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments or examples introduced herein. Those skilled in the art should also realize that such equivalent constructions do not depart from the spirit and scope of the present disclosure, and that they may make various changes, substitutions, and alterations herein without departing from the spirit and scope of the present disclosure.

As used herein, the phrase "at least one of" preceding a series of items, with the term "and" or "or" to separate any of the items, modifies the list as a whole, rather than each member of the list (e.g., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A liquid crystal display (LCD) device, comprising:
   an image display area including a plurality of pixels arranged in a matrix; and
   a peripheral area disposed outside the image display area and including circuitry, wherein:
   the peripheral area includes a first potential supply layer, a second potential supply layer and a third potential supply layer,
   the first potential supply layer, the second potential supply layer and the third potential supply layer are formed in the same layer and have the same voltage of a common electrode of the plurality of pixels in the image display area,
   the second potential supply layer includes bridge patterns separated by spaces,
   the bridge patterns of the second potential supply layer connect the first potential supply layer and the third potential supply layer,
   a plurality of gate lines are formed in the image display area,
   a plurality of gate bus lines are formed in the peripheral area, each of the plurality of gate bus lines electrically is connected with each of the plurality of gate lines, and both of the first potential supply layer and the third potential supply layer overlap with the plurality of gate bus lines.

2. The LCD device of claim 1, wherein the circuitry of the peripheral area includes a switching circuit.

3. The LCD device of claim 1, wherein the circuitry of the peripheral area includes an electrostatic discharge protection circuit.

4. The LCD device of claim 1, wherein the first to third potential supply layers are electrically connected to the common electrode and formed in a same layer and by a same material as the common electrode.

5. The LCD device of claim 1, wherein the circuitry of the peripheral area is disposed within the spaces in a planar view.

6. The LCD device of claim 1,
wherein the plurality of gate bus lines are disposed within the spaces in a planar view.

7. The LCD device of claim 6, wherein the circuitry of the peripheral area includes circuitry for inspecting the plurality of gate bus lines.

8. The LCD device of claim 7, further comprising an inspecting signal line for supplying a signal for inspecting the plurality of gate bus lines, wherein:
the inspection signal line is electrically connected to the circuitry for inspecting the plurality of gate bus lines by connecting wirings, and
the connecting wirings disposed within the spaces in a planar view.

9. The LCD device of claim 7, wherein:
the circuitry for inspecting the plurality of gate bus lines includes a first circuit and a second circuit, and
the first circuit and the second circuit are disposed within one of the spaces in a planar view.

10. The LCD device of claim 7, wherein:
the circuitry for inspecting the plurality of gate bus lines includes a first circuit and a second circuit, and
the first circuit and the second circuit are disposed between adjacent two gate bus lines among the plurality of gate bus lines.

11. The LCD device of claim 7, further comprising:
a first inspecting signal line for supplying a first signal for inspecting the plurality of gate bus lines;
a second inspecting signal line for supplying a second signal for inspecting the plurality of gate bus lines; and
a third inspecting signal line for supplying a third signal for inspecting the plurality of gate bus lines, wherein:
the circuitry for inspecting the plurality of gate bus lines comprises transistors including a first transistor to an n-th transistor provided for a first gate bus line to an n-th gate bus line among the plurality of gate bus lines, respectively, where n is a natural number greater than 1,
gates of the transistors are connected to the first inspecting signal line, and
sources or drains of odd numbered transistors are connected to the second inspecting signal line, and sources or drains of even numbered transistors are connected to the third inspecting signal line.

12. The LCD device of claim 11, wherein:
a pair transistor of a (2k−1)-th transistor and a 2k-th transistor is disposed within one space, and only one pair transistors is disposed in the one space in a planar view, where k is a natural number.

13. The LCD device of claim 1, wherein the bridge patterns of the second potential supply layer extend in parallel with the plurality of gate bus lines.

14. The LCD device of claim 1, wherein a gate bus line among the plurality of gate bus lines is formed between two adjacent bridge patterns among the bridge patterns of the second potential supply layer.

15. The LCD device of claim 1, wherein two gate bus lines among the plurality of gate bus lines are formed between two adjacent bridge patterns among the bridge patterns of the second potential supply layer.

16. The LCD device of claim 1, wherein one circuit among the circuitry of the peripheral area is formed between two adjacent bridge patterns among the bridge patterns of the second potential supply layer.

17. The LCD device of claim 1, wherein two circuits among the circuitry of the peripheral area are formed between two adjacent bridge patterns among the bridge patterns of the second potential supply layer.

18. The LCD device of claim 1, wherein the circuitry of the peripheral area is electrically isolated from the bridge patterns of the second potential supply layer.

19. The LCD device of claim 1, wherein the plurality of gate lines are electrically isolated from the bridge patterns of the second potential supply layer.

* * * * *